United States Patent
Walter

(10) Patent No.: US 9,409,191 B2
(45) Date of Patent: *Aug. 9, 2016

(54) INTERNAL MIXING SPRAY GUN

(71) Applicant: Carlisle Fluid Technologies, Inc., Charlotte, NC (US)

(72) Inventor: Bradley P. Walter, Superior, CO (US)

(73) Assignee: Carlisle Fluid Technologies, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/287,100

(22) Filed: May 26, 2014

(65) Prior Publication Data

US 2014/0252121 A1  Sep. 11, 2014

Related U.S. Application Data

(63) Continuation of application No. 13/675,504, filed on Nov. 13, 2012, now Pat. No. 8,757,515, which is a continuation of application No. 12/502,527, filed on Jul. 14, 2009, now Pat. No. 8,322,632.

(51) Int. Cl.
| | |
|---|---|
| *F23D 11/16* | (2006.01) |
| *B05B 7/02* | (2006.01) |
| *B01F 5/02* | (2006.01) |
| *B01F 5/06* | (2006.01) |
| *B29B 7/74* | (2006.01) |
| *B05B 15/02* | (2006.01) |
| *B01F 5/00* | (2006.01) |
| *B05B 7/04* | (2006.01) |

(52) U.S. Cl.
CPC ............. *B05B 7/02* (2013.01); *B01F 5/0256* (2013.01); *B01F 5/0615* (2013.01); *B01F 5/0682* (2013.01); *B01F 5/0688* (2013.01); *B05B 15/025* (2013.01); *B29B 7/7438* (2013.01); *B01F 2005/0034* (2013.01); *B05B 7/0408* (2013.01)

(58) Field of Classification Search
CPC .. B05B 7/2455; B05B 7/0416; B05B 7/0441; B05B 7/1209; B05B 7/2478
USPC .............. 239/419, 424.5, 427, 433, 413, 569, 239/498, 398
See application file for complete search history.

(56) References Cited

U.S. PATENT DOCUMENTS

| | | |
|---|---|---|
| 3,297,305 A | 1/1967 | VValden |
| 3,506,460 A | 4/1970 | Bayne |
| 3,709,468 A | 1/1973 | Ives |
| 3,759,450 A | 9/1973 | Fram et al. |
| 3,790,030 A | 2/1974 | Ives |

(Continued)

FOREIGN PATENT DOCUMENTS

| | | |
|---|---|---|
| DE | 7733456 U1 | 5/1978 |
| GB | 1236883 | 6/1971 |

(Continued)

*Primary Examiner* — Davis Hwu
(74) *Attorney, Agent, or Firm* — Fletcher Yoder, P.C.

(57) ABSTRACT

A system, in certain embodiments, includes a spray device including a first liquid passage configured to flow a first liquid in a generally downstream direction toward a spray tip. The spray device also includes a second liquid passage configured to flow a second liquid in a generally upstream direction such that the second liquid impinges upon the first liquid at an outlet to the second liquid passage. The upstream direction is substantially opposite from the downstream direction.

20 Claims, 9 Drawing Sheets

(56) References Cited

U.S. PATENT DOCUMENTS

| | | |
|---|---|---|
| 3,955,573 A | 5/1976 | Hansen et al. |
| 4,760,956 A | 8/1988 | Mansfield |
| 5,143,296 A | 9/1992 | Saurwein et al. |
| 5,176,448 A | 1/1993 | King et al. |
| 5,203,474 A | 4/1993 | Haynes |
| 5,868,495 A | 2/1999 | Hidalgo |
| 6,042,261 A | 3/2000 | Sinders |
| 6,089,324 A | 7/2000 | Mahrt |
| 6,148,536 A | 11/2000 | Iijima |
| 6,250,564 B1 | 6/2001 | Chahley |
| 8,322,632 B2 | 12/2012 | Walter |
| 2007/0157972 A1 | 7/2007 | Hendey |

FOREIGN PATENT DOCUMENTS

| | | |
|---|---|---|
| JP | S5827625 A | 2/1983 |
| JP | S5827627 A | 2/1983 |
| WO | 9745194 | 12/1997 |
| WO | 2004089522 A1 | 10/2004 |

INTERNAL MIXING SPRAY GUN

CROSS REFERENCE TO RELATED APPLICATIONS

This application is a continuation of U.S. patent application Ser. No. 13/675,504, entitled "INTERNAL MIXING SPRAY GUN", filed Nov. 13, 2012, which is a continuation of U.S. patent application Ser. No. 12/502,527, entitled "INTERNAL MIXING SPRAY GUN", filed Jul. 14, 2009, now U.S. Pat. No. 8,322,632. Each of the foregoing applications is hereby incorporated by reference in its entirety.

BACKGROUND

The invention relates generally to an internal mixing spray gun and, more specifically, to a system for effectively mixing multiple materials having substantially different viscosities and flow rates.

In many applications, two or more base materials are mixed together to achieve a material composition. The base materials may include different liquids, solids, or some combination thereof. The characteristics of the material composition may depend significantly on the uniformity of mixing of the two or more base materials. For example, if a resin and a catalyst are not adequately mixed together, then the material composition may be weak due to uncured portions of the resin. Unfortunately, existing systems often fail to adequately mix such base materials together, thereby reducing the quality of the final product.

BRIEF DESCRIPTION

A system, in certain embodiments, includes a spray device including a first liquid passage configured to flow a first liquid in a generally downstream direction toward a spray tip. The spray device also includes a second liquid passage configured to flow a second liquid in a generally upstream direction such that the second liquid impinges upon the first liquid at an outlet to the second liquid passage. The upstream direction is substantially opposite from the downstream direction.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
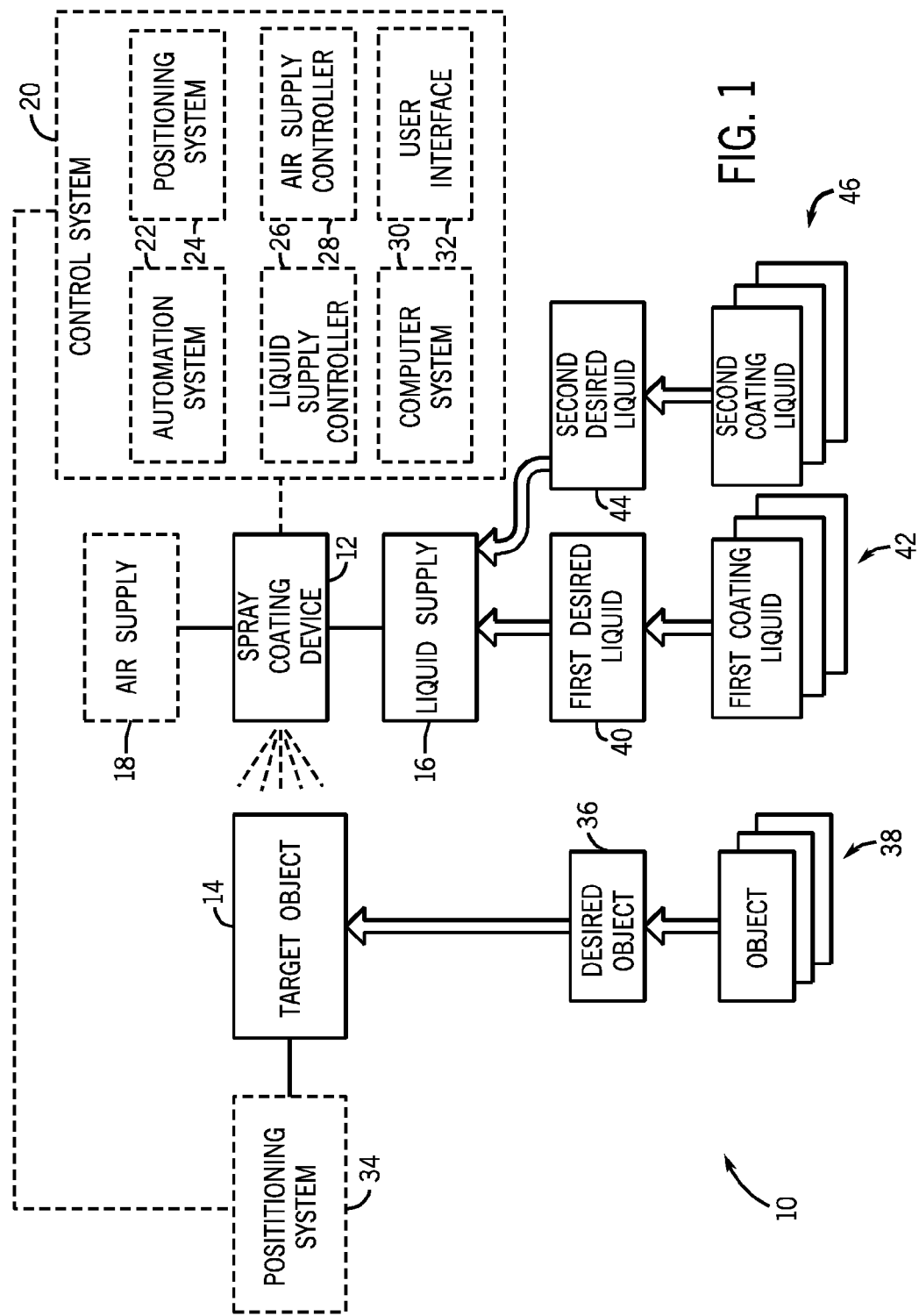
FIG. 1 is a diagram illustrating an exemplary spray coating system in accordance with certain embodiments of the present technique.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Spray guns configured to mix plural components may be employed to apply a wide variety of materials, such as multi-component paints, urethane foam, epoxy resin, and polyester or vinylester resin. For example, polyester or vinylester resin is typically utilized in the manufacture of fiberglass reinforced plastic (FRP) parts, such as boat hulls, bathtubs and shower stalls. The process of producing an FRP part generally includes applying sheets of fiberglass (e.g., chopped strand mat, woven roving, etc.) to a mold, and then spraying a combination of a resin and a catalyst onto the fiberglass. Once the resin and catalyst are mixed, the resin beings to set, ultimately forming the plastic element of the FRP composite structure.

As discussed below, the disclosed spray guns are configured to internally mix multiple materials, such as the resin and catalyst, prior to spraying. The disclosed embodiments are configured to provide significant internal mixing to produce a substantially homogeneous mixture, even with different materials (e.g., resin and catalyst) having significantly different viscosities and flows rates. For example, an example of a catalyst for polyester resins includes Methyl Ethyl Ketone Peroxide (MEKP). The viscosity of MEKP may be approximately 10 times lower than the viscosity of the resin. Furthermore, only 1% to 3% of MEKP by volume may be utilized to catalyze polyester resins. Despite the significant differences in viscosity and flow rate, the disclosed embodiments of spray guns are configured to provide significant internal mixing in a compact space (e.g., short length) of the spray guns, rather than requiring long mixing sections. Thus, the disclosed spray guns may be compact, easily maneuverable, and highly efficient at mixing multiple materials. As a result, the disclosed spray guns reduce waste and increase quality of the mixture applied to a target object, e.g., increased strength of the FRP part.

Embodiments of the present disclosure may facilitate effective mixing of multiple materials having substantially different flow rates and viscosities within a spray gun. In certain embodiments, a spray gun includes a first liquid passage configured to flow a first liquid in a generally downstream direction toward a spray tip. The spray gun also includes a second liquid passage extending within the first liquid passage and configured to flow a second liquid in a generally upstream direction, substantially opposite from the downstream direction, such that the second liquid impinges upon the first liquid at an outlet to the second liquid passage. The impingement of the second liquid upon the first liquid establishes a region of turbulent flow that serves to mix the first liquid with the second liquid. Further embodiments include multiple mixing baffles positioned downstream from the outlet to the second liquid passage. In such embodiments, each mixing baffle includes at least one set of converging passages configured to direct liquid flows toward one another. As one liquid flow impinges another, a turbulent flow is established that serves to further mix the first liquid and the second liquid. In certain configurations, the at least one set of converging passages of a first mixing baffle is circumferential offset from the at least one set of converging passages of another mixing baffle. This circumferential offset forces the liquid flow to follow a tortuous path through the baffles, thereby further mixing the first and second liquids. The combination of these features may result in effective mixing of the first liquid and the second liquid despite significant differences in flow rate and viscosity.

FIG. 1 is a flow chart illustrating an exemplary spray coating system 10, which comprises a spray coating device 12 for applying a desired coating to a target object 14. The spray coating device 12 may be coupled to a variety of supply and control systems, such as a liquid supply 16, an air supply 18, and a control system 20. The control system 20 facilitates control of the liquid and air supplies 16 and 18 and ensures that the spray coating device 12 provides an acceptable quality spray coating on the target object 14. For example, the control system 20 may include an automation system 22, a positioning system 24, a liquid supply controller 26, an air supply controller 28, a computer system 30, and a user interface 32. The control system 20 also may be coupled to a positioning system 34, which facilitates movement of the target object 14 relative to the spray coating device 12. Accordingly, the spray coating system 10 may provide a computer-controlled mixture of coating liquid, liquid and air flow rates, and spray pattern. Moreover, the positioning system 34 may include a robotic arm controlled by the control system 20, such that the spray coating device 12 covers the entire surface of the target object 14 in a uniform and efficient manner.

The spray coating system 10 of FIG. 1 is applicable to a wide variety of applications, liquids, target objects, and types/configurations of the spray coating device 12. In the present embodiment, the spray coating device 12 is configured to internally mix multiple liquids prior to spraying. In such an embodiment, a user may select a first desired liquid 40 from a plurality of different first coating liquids 42, and a second desired liquid 44 from a plurality of different second coating liquids 44. For example, the first coating liquid may be a resin and the second coating liquid may be a catalyst configured to cure the resin. In such a configuration, the first coating liquid may include polyester, vinylester, or epoxy resin, and the second coating liquid may include Methyl Ethyl Ketone Peroxide (MEKP) or an Aliphatic Amine adduct, for example. Certain embodiments may include unique features configured to facilitate effective mixing of the first desired liquid 40 and the second desired liquid 44 despite significant differences in flow rate and viscosity. The user also may select a desired object 36 from a variety of different objects 38, such as different material and product types. For example, the target object may include fiberglass sheets disposed within a mold such that spraying a combination of resin and catalyst onto the target forms a fiberglass reinforced plastic (FRP) part after the resin has cured. As discussed in further detail below, the spray coating device 12 also may comprise a variety of different components and spray formation mechanisms to accommodate the target object 14 and liquid supply 16 selected by the user. For example, the spray coating device 12 may comprise an air atomizer, a rotary atomizer, an electrostatic atomizer, or any other suitable spray formation mechanism.

Figure 2:
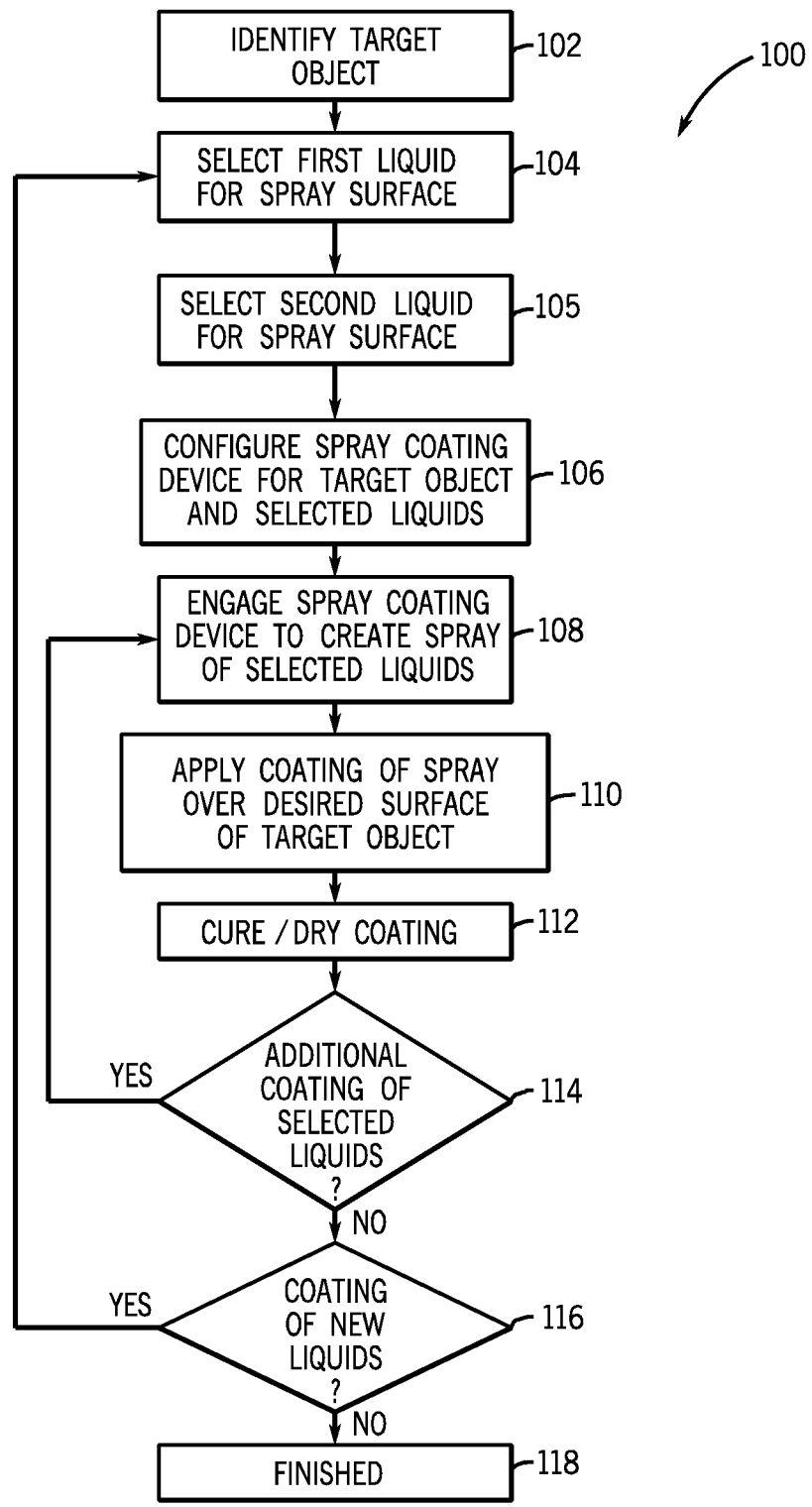
FIG. 2 is a flow chart illustrating an exemplary spray coating process in accordance with certain embodiments of the present technique.

FIG. 2 is a flow chart of an exemplary spray coating process 100 for applying a desired spray coating to the target object 14. As illustrated, the process 100 proceeds by identifying the target object 14 for application of the desired liquids, as represented by block 102. The process 100 then proceeds by selecting the desired liquids for application to a spray surface of the target object 14. Specifically, a user selects a first liquid 40, as represented by block 104, and then selects a second liquid 44, as represented by block 105. As will be appreciated, the second liquid 44 may be selected based on the selection of the first liquid 40. For example, if the first desired liquid 40 is a resin, the second desired liquid 44 may be a catalyst configured to effectively cure the selected resin. As discussed in detail below, certain embodiments may include unique features configured to facilitate effective mixing of the first desired liquid 40 and the second desired liquid 44 despite significant differences in flow rate and viscosity. A user may then proceed to configure the spray coating device 12 for the identified target object 14 and selected liquids, as represented by block 106. As the user engages the spray coating device 12, the process 100 then proceeds to create a spray of the selected liquids, as represented by block 108. The user may then apply a coating of the spray over the desired surface of the target object 14, as represented by block 110. Next, as represented by block 112, the process 100 proceeds to cure/dry the coating applied over the desired surface. If an additional coating of the selected liquids is desired by the user at query block 114, then the process 100 proceeds through blocks 108, 110, and 112 to provide another coating of the selected liquids. If the user does not desire an additional coating of the selected liquids at query block 114, then the process 100 proceeds to query block 116 to determine whether a coating of new liquids is desired by the user. If the user desires a coating of new liquids at query block 116, then the process 100 proceeds through blocks 104-114 using new selected liquids for the spray coating. If the user does not desire a coating of new liquids at query block 116, then the process 100 is finished at block 118.

Figure 3:
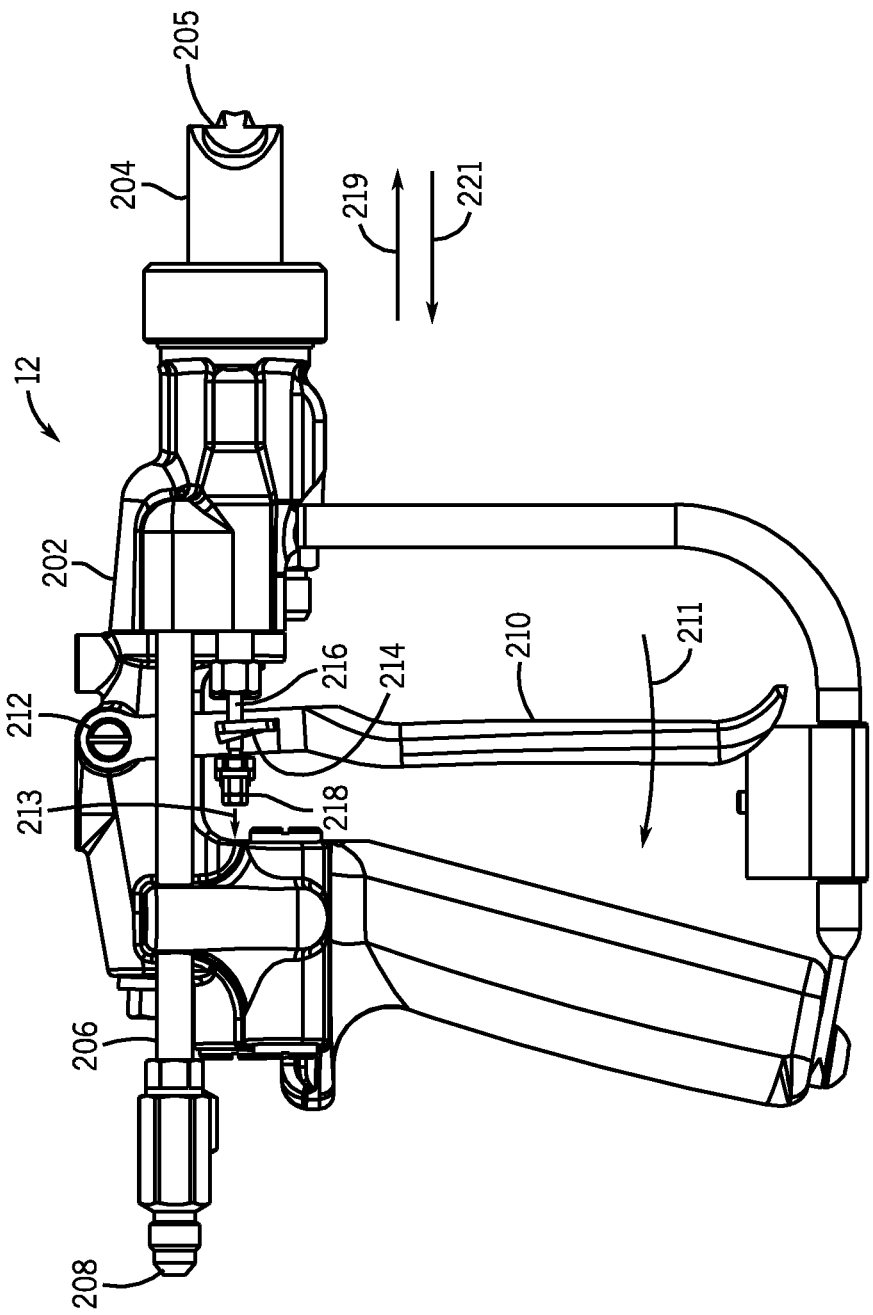
FIG. 3 is a right side view of an exemplary spray coating device in accordance with certain embodiments of the present technique.

FIG. 3 is a right side view of an exemplary embodiment of the spray coating device 12. As illustrated, the spray coating device 12 includes a body 202 configured to receive and mix multiple liquids prior to spraying. The spray coating device 12 also includes a nozzle assembly 204. As discussed in detail below, the nozzle assembly 204 includes a static mixer configured to provide additional mixing of the liquids. The nozzle assembly 204 also includes a discharge orifice or spray tip 205 that ultimately directs the liquids toward the target 14. The illustrated spray tip 205 includes two converging exit orifices configured to direct streams of liquid toward one another. This type of spray tip 205 may be described as an impingement tip, and provides a relatively coarse spray pattern. Such a spray pattern may be well suited for applications involving spraying resin and catalyst to form FRP parts. Alternative embodiments may include different spray tips 205, such as atomizer tips for applying gel coats, or the like. Furthermore, the nozzle assembly 204 of the present embodiment is configured to be removable from the body 202 such that a particular nozzle assembly 204 may be selected for a specific application.

The spray coating device 12 also includes connectors and conduits configured to deliver a first liquid and a second liquid into the body 202. Specifically, FIG. 3 shows the second liquid conduit 206 and the second liquid inlet 208. In the present configuration, the second liquid may be a catalyst configured to cure a resin (i.e., first liquid). For example, in certain embodiments, the first liquid is a polyester resin and the second liquid is MEKP. In such configurations, the second liquid conduit 206 may be configured to flow approximately 1% to 3% of the volume of the first liquid conduit, thereby establishing a volumetric ratio of resin and catalyst within a mixing portion of the body 202 to achieve proper curing.

The spray coating device 12 further includes a trigger 210 configured to regulate the flow of the first and second liquids into the body 202. Specifically, the trigger 210 is rotationally coupled to the body 202 at a pivot point 212. The trigger 210 is also coupled to needle valves that control the flow of the first and second liquids. As illustrated, the trigger 210 includes a mount 214. A shaft 216 coupled to the second liquid needle valve (i.e., 301 of FIG. 5) extends through an opening within the mount 214. A fastener 218 is secured to an opposite end of the shaft 216 from the needle valve. As the trigger 210 is rotated in a direction 211 about the pivot point 212, the mount 214 contacts the fastener 218. Further rotation of the trigger 210 moves the shaft 216 in a direction 213 via contact between the mount 214 and the fastener 218. Movement of the shaft 216 opens the second liquid needle valve and initiates flow of the second liquid into a mixing portion of the body 202. As discussed in detail below, the mixing portion includes an assembly configured to flow the second liquid in a substantially upstream direction 221 relative to the downstream flow 219 of the first liquid. Impingement of the second liquid upon the first liquid may establish a turbulent flow that enhances mixing of the two liquids. Furthermore, mixing baffles employing circumferentially offset converging passages may be positioned downstream from the outlet of the second liquid to further facilitate mixing. The combination of these features may result in effective mixing of the first liquid and the second liquid despite significant differences in flow rate and viscosity.

Figure 4:
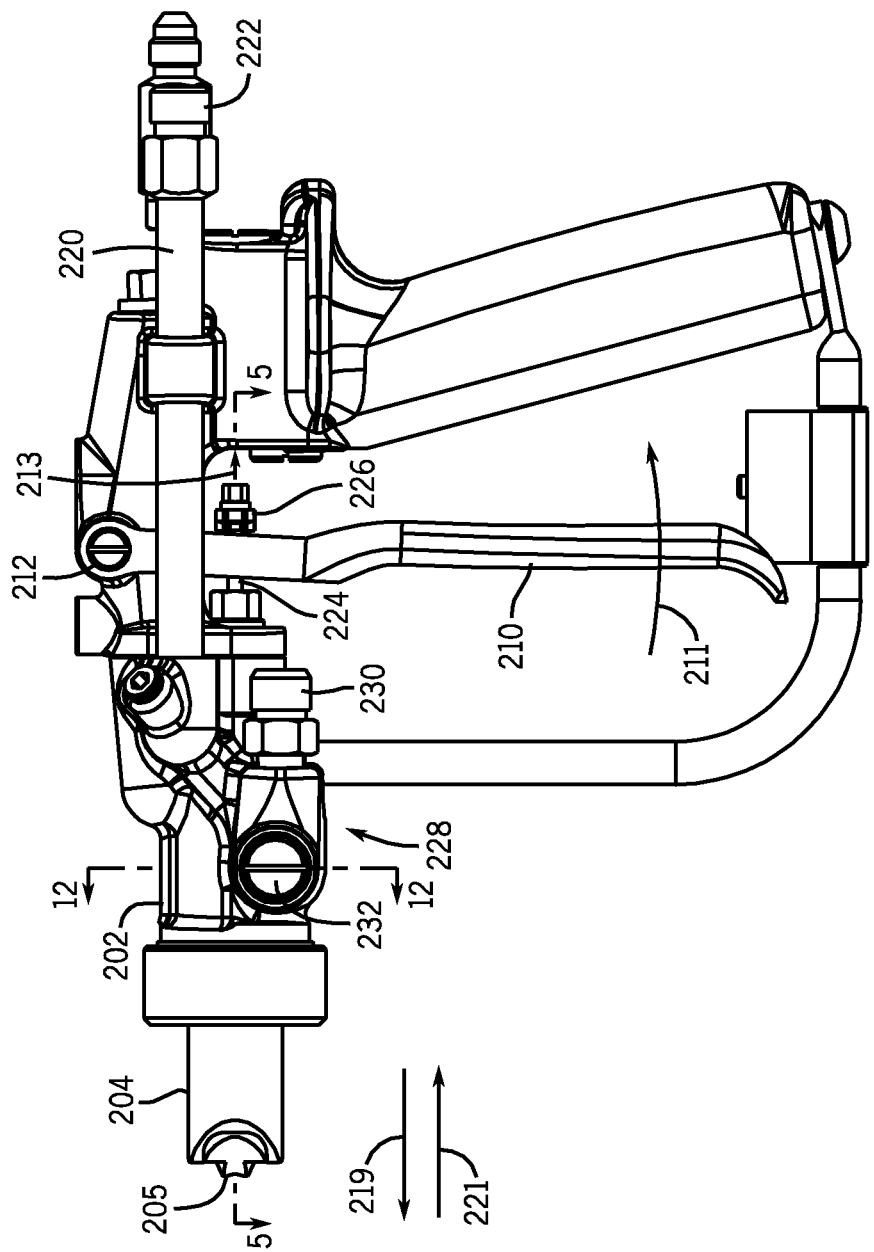
FIG. 4 is a left side view of the spray coating device, as shown in FIG. 3, in accordance with certain embodiments of the present technique.

FIG. 4 is a left side view of the spray coating device 12 shown in FIG. 3. As illustrated, a first liquid conduit 220 including a first liquid inlet 222 extends into the body 202. As previously discussed, the first liquid conduit 220 is configured to flow a significantly higher volume of liquid into the body 202 than the second liquid conduit 206. Similar to the arrangement described above with regard to the second liquid, the trigger 210 is configured to regulate the flow of first liquid into the spray coating device 12. Specifically, a shaft 224 is disposed through the trigger 210 and coupled to a fastener 226. As the trigger 210 rotates in the direction 211 about the pivot point 212, contact between the trigger 210 and the fastener 226 causes the shaft 224 to move in the direction 213 away from the body 202. Because the shaft 224 is coupled to a needle valve (i.e., 329 of FIG. 5) within the body 202, movement of the shaft 224 in the direction 213 causes the needle valve to open, thereby facilitating a flow of first liquid into the mixing portion of the body 202.

FIG. 4 also illustrates a liquid flushing system 228 configured to flow a solvent through the spray coating device 12. Because the spray coating device 12 is configured to receive and mix a resin and a catalyst, any liquid remaining in the body 202 after use may begin to set and eventually cure. Therefore, the liquid flushing system 228 is configured to flow a solvent through the mixing portion of the body 202 after spraying of the liquids is complete to substantially remove the liquids from the spray coating device 12. Specifically, the liquid flushing system 228 includes an inlet 230 and an activation switch 232. As discussed in detail below, depression of the activation switch 232 engages a flow of solvent through the inlet 230 into the body 202. The solvent is configured to dissolve and remove residual liquids from the spray coating device 12 to substantially reduce or eliminate the possibility that resin may cure within the body 202 and interfere with operation of the spray coating device 12.

Figure 5:
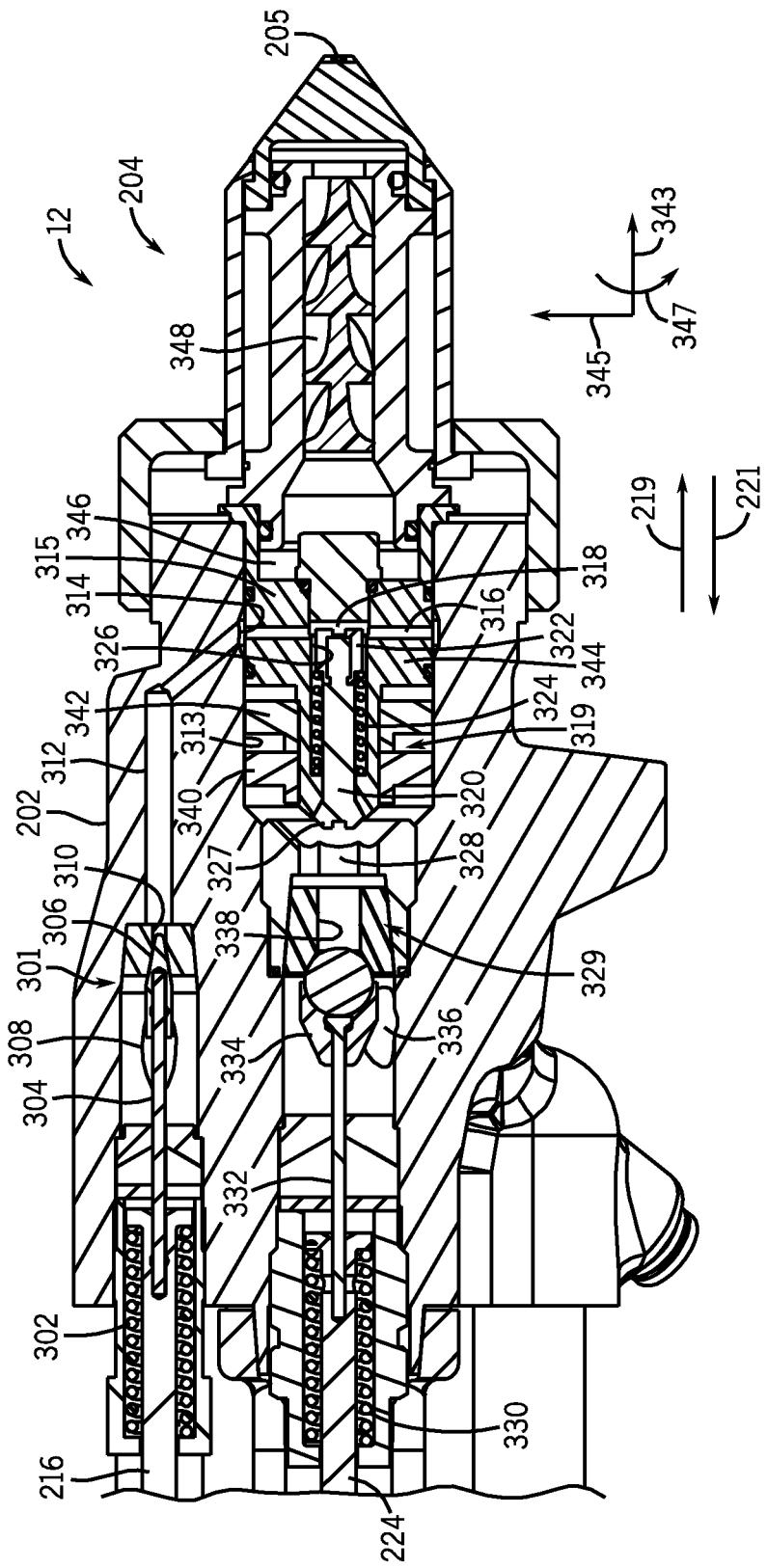
FIG. 5 is a cross-sectional bottom view of the spray coating device, taken along line 5-5 of FIG. 4, in accordance with certain embodiments of the present technique.

FIG. 5 is a cross-sectional bottom view of the spray coating device 12, taken along line 5-5 of FIG. 4. As previously discussed, the shaft 216 is coupled to a needle valve 301 configured to regulate the flow of second liquid into the mixing portion of the body 202. Specifically, the shaft 216 is coupled to a compression spring 302 configured to bias the needle valve 301 into a closed position. A secondary shaft 304 extends between the shaft 216 and a plunger 306. While in the closed position, the plunger 306 blocks the flow of second liquid from an inlet 308, which is coupled to the second liquid conduit 206. Specifically, the plunger 306 is disposed within an orifice 310 contoured to correspond to the shape of the plunger 306, thereby forming a seal when the needle valve 301 is in the closed position. As the trigger 210 rotates about the pivot 212, contact between the mount 214 and the fastener 218 causes the shaft 216 to move away from the body 202 and compress the spring 302. As the spring 302 compresses, coupling between the shaft 216 and the secondary shaft 304 causes the plunger 306 to exit the orifice 310, thereby facilitating liquid flow from the inlet 308 through orifice 310.

The second liquid then flows through a conduit 312 to a mixing portion 313 of the body 202. The second liquid first enters an annular recess or cavity 314 disposed within the mixing portion 313. The annular cavity 314 serves to distribute the second liquid substantially evenly about the circumference of a valve body 315. The second liquid then enters the valve body 315 via conduits 316 extending radially through the valve body 315 between the cavity 314 and a central chamber 318. A check valve 319 is disposed adjacent to the central chamber 318 and serves to block the flow of first liquid into the central chamber 318. As illustrated, the check valve 319 includes a shaft 320, a retainer 322, and a compression spring 324, each being disposed within a central opening or cavity 326. The second liquid flows from the central chamber 318 through a gap between the retainer 322 and the central cavity 326, and then through a space between the shaft 320 and the central cavity 326 (i.e., adjacent to the compression spring 324). While in a closed position, the check valve 319 blocks the flow of the second liquid. Specifically, a head 327 of the shaft 320 is biased against the valve body 315 by the compression spring 324, thereby restricting the flow of second liquid.

As discussed in detail below, a mixing chamber 328 is disposed adjacent to the head 327 and contains the first liquid. The check valve 319 is configured to open when the liquid pressure of the second liquid is greater than the liquid pressure of the first liquid plus an addition pressure sufficient to overcome the spring bias of the check valve 319. For example, in certain configurations, the liquid pressure of the second liquid is approximately 300 psi and the liquid pressure of the first liquid is approximately 200 psi. In such configurations, the pressure sufficient to overcome the spring bias may be less than 100 psi. Therefore, when the second liquid enters the central cavity 326, the liquid pressure may be sufficient to open the check valve 319 and facilitate mixing of the second liquid with the first liquid in the mixing chamber 328. Furthermore, because the pressure of the second liquid is greater than the pressure of the first liquid, the mixture will not flow back through the check valve 319. If the pressure of the second liquid drops below the pressure of the first liquid (plus the pressure sufficient to overcome the spring bias), the check valve will close, thereby blocking the flow of the first liquid into the central cavity 326. This configuration substantially reduces or eliminates the possibility of liquid mixing within the flow path of the second liquid.

Similar to the arrangement described above with respect to the second liquid flow path, flow of the first liquid is regulated by a needle valve 329. Specifically, the shaft 224 is coupled to a compression spring 330 configured to bias the needle valve 329 into a closed position. A secondary shaft 332 extends between the shaft 224 and a plunger 334. While in the closed position, the plunger 334 blocks the flow of first liquid from an inlet 336, which is coupled to the first liquid conduit 220. As illustrated, the plunger 334 is disposed within an orifice 338 contoured to correspond to the shape of the plunger 334, thereby forming a seal when the needle valve 329 is in the closed position. As the trigger 210 rotates about the pivot 212, contact between the trigger 210 and the fastener 226 causes the shaft 224 to compress the spring 330. As the spring 330 compresses, coupling between the shaft 224 and the secondary shaft 332 causes the plunger 334 to exit the orifice 338, thereby facilitating liquid flow from the inlet 336 through orifice 338.

With the needle valve 329 in the open position, the first liquid flows in a generally downstream direction 219 from the orifice 338 to the nozzle assembly 204. Specifically, the first liquid flows from the orifice 338 into the mixing chamber 328. As previously discussed, the second liquid flows into the mixing chamber 328 in a generally upstream direction 221, substantially opposite from the downstream direction 219 (e.g., approximately 180 degrees relative to one another). In the present embodiment, the second liquid enters the mixing chamber 328 through a substantially annular orifice formed by the gap between the head 327 of the check valve shaft 320 and the valve body 315. The annular orifice is configured to provide a generally even distribution of second liquid into the first liquid present in the mixing chamber 328. Because the first liquid is flowing in a generally downstream direction 219 and the second liquid is flowing in a generally upstream direction 221, interaction between the liquids induces a turbulent flow within the mixing chamber 328, thereby effectively mixing the first liquid with the second liquid.

As previously discussed, the liquid pressure of the second liquid exiting the check valve 319 is greater than the pressure of the first liquid within the mixing chamber 328. Therefore, flow of the mixed liquid is blocked from entering the central opening 326. As a result, the liquid mixture is directed in a generally downstream direction 219 into the mixing portion 313 of the body, i.e., between the valve body 315 and an inner surface of the mixing portion 313. The liquid then passes through a first mixing baffle 340. As discussed in detail below, the first mixing baffle 340 includes multiple sets of converging passages, each set configured to direct liquid flows toward one another. As one liquid flow impinges another, a turbulent flow is established that serves to further mix the first liquid and the second liquid. The liquid mixture then flows through a second mixing baffle 342 similar to the first mixing baffle 340 to further mix the liquids. In certain configurations, the converging passages of the first baffle 340 are circumferential offset (i.e., shifted along a circumferential direction 347) from the converging passages of the second baffle 342. This circumferential offset forces the liquid flow to follow a tortuous path through the baffles 340 and 342, thereby further mixing the first and second liquids.

After passing through the baffles 340 and 342, the mixed liquid continues to flow in the downstream direction 219. Specifically, the liquid passes through flow passages within a downstream section 344 of the valve body 315. The flow then passes through a passage 346 downstream of the valve body 315 and enters a static mixer 348 within the nozzle assembly 204. The static mixer 348 includes a series of turning vanes, each configured to split the flow in half and rotate each half approximately 90 degrees. The splitting and turning motion serves to further mix the liquid. The present configuration includes four turning vanes. However, alternative configurations may employ more or fewer vanes. For example, certain configurations may include 0, 1, 2, 3, 4, 5, 6, 7, 8, or more vanes in the static mixer 348. After passing through the static mixer 348, the liquid exits the spray tip 205. The mixing features within the spray coating device 12 serve to effectively mix the first liquid with the second liquid despite significant differences in flow rate and viscosity. Furthermore, the combination of impinging flow and the mixing baffles establish a well-mixed liquid within a shorter distance than spray coating devices that only employ static mixers, thereby resulting in a shorter, lighter and less cumbersome spray coating device 12.

Figure 6:
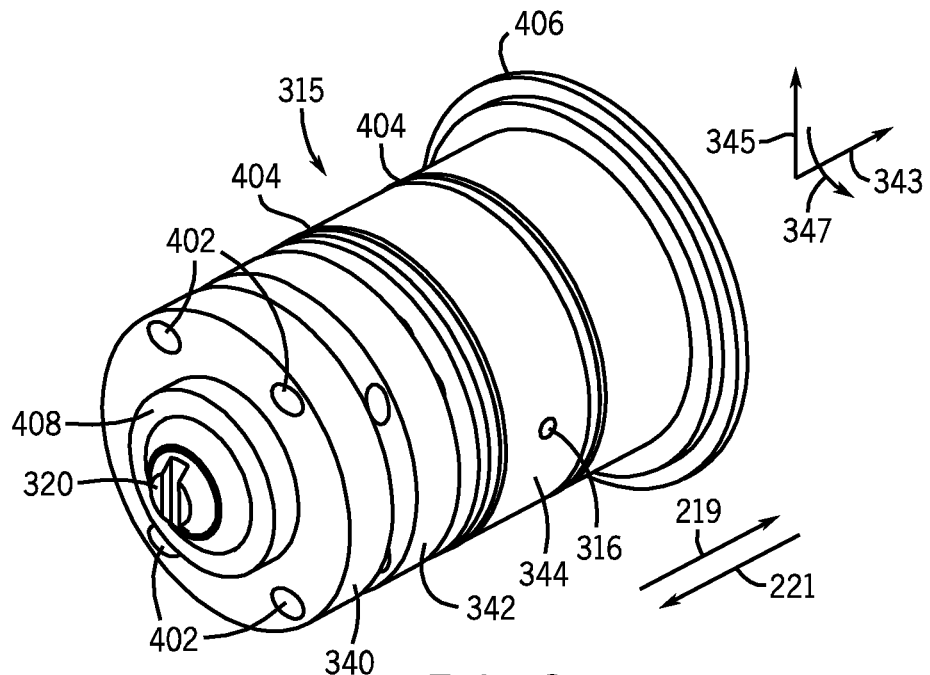
FIG. 6 is a perspective view of a valve body, as shown in FIG. 5, in accordance with certain embodiments of the present technique.

FIG. 6 is a perspective view of the valve body 315 shown in FIG. 5. As previously discussed, the valve body 315 includes the first baffle 340, the second baffle 342, and the downstream section 344. FIG. 6 also illustrates another perspective of the conduit 316 configured to transfer the second liquid from the annular cavity 314 to the central opening 326, and the check valve shaft 320 configured to block the flow of first liquid into the central opening 326. As discussed in detail below, each baffle 340 and 342 includes at least one set of converging passages 402 configured to direct liquid flows toward one another in the downstream direction 219. The present embodiment includes two sets of two converging passages 402. Alternative embodiments may include more or fewer sets of passages and/or more or fewer passages 402 per set. For example, certain embodiments may include 1, 2, 3, 4, 5, 6, 7, 8, or more sets of converging passages. Further embodiments may include 2, 3, 4, 5, 6, 7, 8, or more passages 402 within each set. Because of the converging arrangement, liquid exiting one passage of a set is directed toward liquid exiting another passage of the set. The impingement of the two or more liquid streams establishes a turbulent flow that facilitates additional mixing of the first liquid with the second liquid.

The configuration of the second baffle 342 may be substantially similar to the configuration of the first baffle 340. However, in certain embodiments, the second baffle 342 is rotated about a longitudinal axis of the valve body 315, thereby establishing a circumferential offset between the passages 402. In such embodiments, liquid exiting the passages 402 of the first baffle 340 impinges upon an upstream surface of the second baffle 342, thereby establishing a turbulent flow that facilitates liquid mixing. In addition, the offset forces the liquid to flow in the circumferential direction 347 between the first baffle 340 and the second baffle 342, thereby establishing a tortuous flow path. As will be appreciated, the more tortuous the flow path, the greater the mixing effectiveness. For example, in certain configurations, a set of passages within the first baffle 340 may be rotated at least approximately 20, 45, 60, 80, 100, 120, 140, 160, 180, or more degrees relative to a set of passages within the second baffle 342.

As illustrated, the valve body 315 also includes a pair of o-rings 404 configured to establish a seal between the valve body 315 and the inner surface of the mixing portion 313. Specifically, the o-rings are positioned on opposite longitudinal sides of the liquid conduits 316. In this configuration, the o-rings 404 serve to substantially maintain a barrier between the second liquid entering the conduits 316 and the mixed liquid passing through the baffles 340 and 342. The valve body 315 also includes a flange 406 configured to position the valve body 315 within the mixing portion 313 of the body 202. Furthermore, as illustrated, each baffle 340 and 342 includes a flange 408 configured to establish a gap between the baffles 340 and 342. This gap facilitates mixing of the liquid exiting the first baffle 340 before flowing into the second baffle 342. Consequently, the flanges 408 facilitate axial stacking (i.e., along an axial direction 343) of baffles within the valve body 315. For example, while two baffles 340 and 342 are employed in the present embodiment, alternative embodiments may include more or fewer baffles, such as 1, 2, 3, 4, 5, 6, 7, 8, or more baffles.

Figure 7:
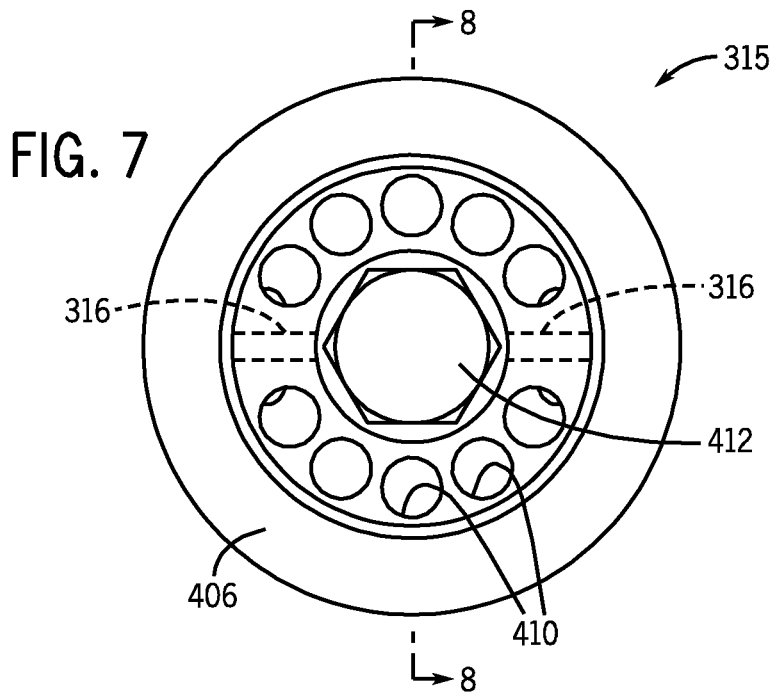
FIG. 7 is a front view of the valve body, as shown in FIG. 5, in accordance with certain embodiments of the present technique.

FIG. 7 is a front view of the valve body 315, illustrating flow passages 410 within the downstream portion 344. The flow passages 410 enable the mixed liquid to flow from the baffles 340 and 342 to the downstream passage 346. As illustrated, a gap between the flow passages 410 facilitates placement of the conduits 316, such that the second liquid may flow into the central opening 326 without contacting the downstream flow of the mixed liquid. The present embodiment includes 10 circular passages 410. Alternative embodiments may include passages 410 of different shapes, such as elliptical, square, or polygonal, for example. Further embodiments may include more or fewer passages. For example, certain embodiments may include more than 1, 2, 4, 6, 8, 10, 12, 14, 16, or more passages 410. Furthermore, a fastener 412 is coupled to the downstream end of the valve body 315. The fastener 412 serves to separate the flow of second liquid within the central opening 326 from the mixed liquid flowing through the passages 410.

Figure 8:
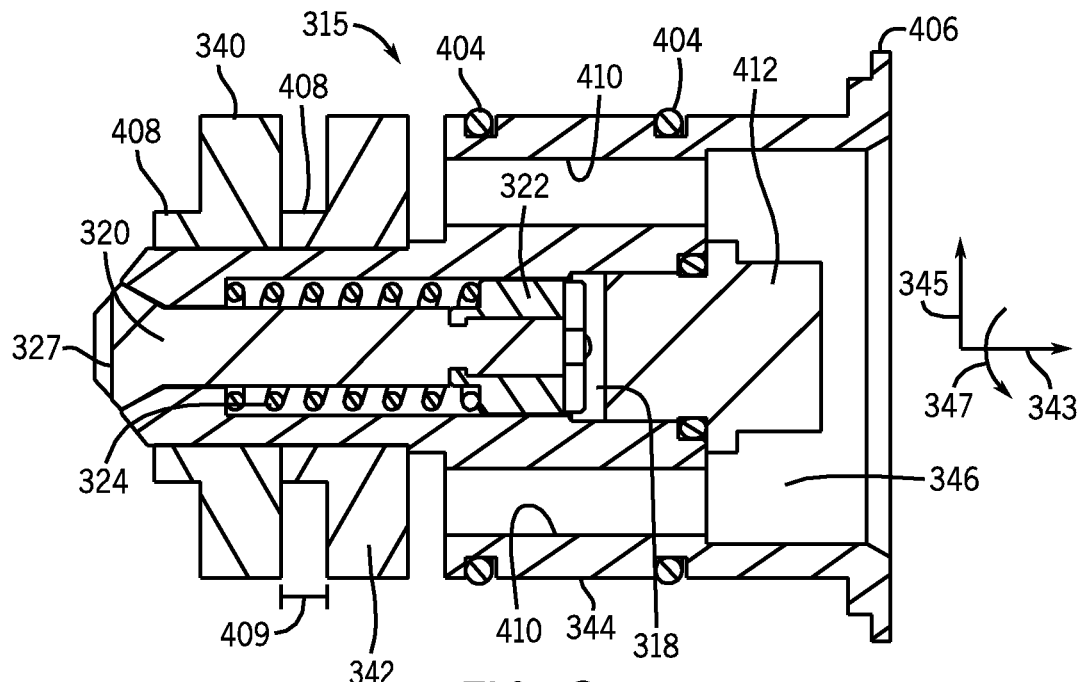
FIG. 8 is a cross-sectional side view of the valve body, taken along line 8-8 of FIG. 7, in accordance with certain embodiments of the present technique.

FIG. 8 is a cross-sectional side view of the valve body 315, taken along line 8-8 of FIG. 7. As illustrated, the flow passages 410 extend along the entire longitudinal extent of the downstream portion 344 of the valve body 315. Therefore, the passages 410 serve to facilitate liquid flow from the baffles 340 and 342 to the downstream passage 346. In addition, FIG. 8 illustrates the spacing provided by the flanges 408. Specifically, the flange 408 of the second baffle 342 establishes an axial gap 409 between the first baffle 340 and the second baffle 342 in the axial direction 343. The axial gap 409 provides a space for liquid from the converging passages of the first baffle 340 to intersect and mix prior to flowing into the second baffle 342. Because each baffle includes a flange 408, additional baffles may be axially stacked either upstream or downstream from the illustrated baffles 340 and 342, while providing an axial gap 409 between baffles for liquid mixing.

Figure 9:
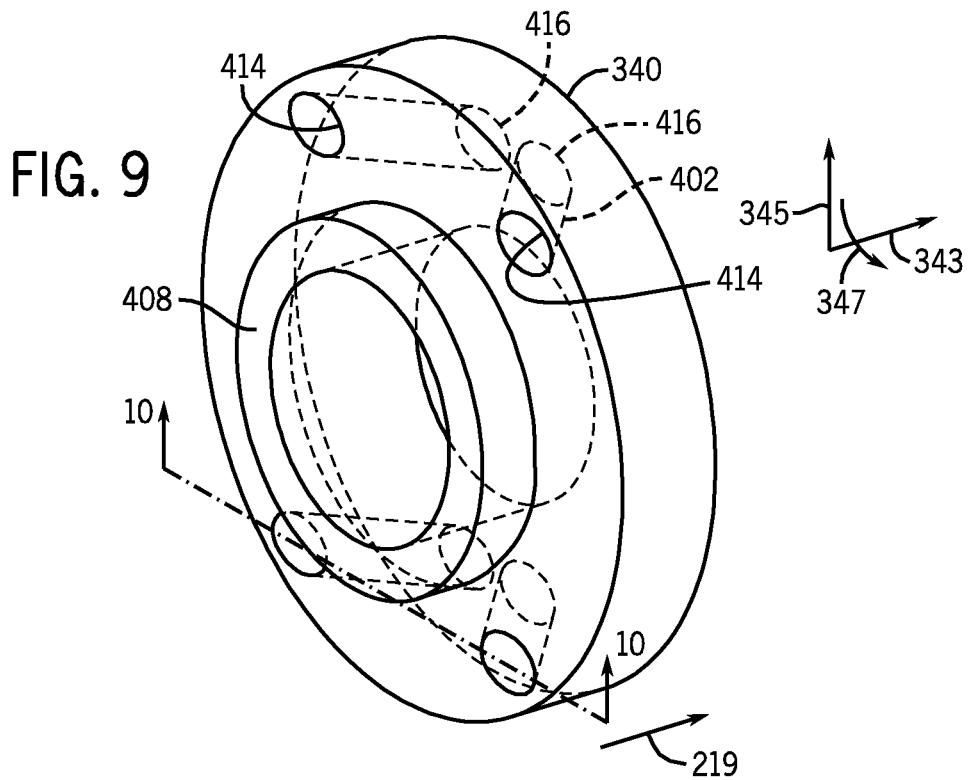
FIG. 9 is a perspective view of a mixing baffle, as shown in FIG. 5, in accordance with certain embodiments of the present technique.

FIG. 9 is a perspective view of the mixing baffle 340. As previously discussed, the baffle 340 includes two sets of flow passages, where each set includes two passages 402. As illustrated, the sets of flow passages are positioned approximately 180 degrees apart along the circumference of the baffle 340. The flow passages 402 within each set converge in the downstream direction 219. Specifically, each flow passage includes an inlet 414 and an outlet 416. Because the inlets 414 are spaced farther apart than the outlets 416, flows through the passages 402 are directed toward one another. As the two flows intersect, a turbulent flow is established, thereby facilitating mixing of the liquids. As previously discussed, the number of sets, the circumferential position of the sets and the number of passages 402 within each set may vary in alternative embodiments.

In the present embodiment, the converging flow passages 402 are configured to direct liquid flows toward one another substantially within a plane parallel to the axial direction 343. In alternative embodiments, the converging flow passages 402 may be rotated in the radial direction 345 and/or the circumferential direction 347 such that impingement of one liquid upon another establishes a swirling liquid flow. This swirling flow may facilitate additional mixing of the first and second liquids.

Figure 10:
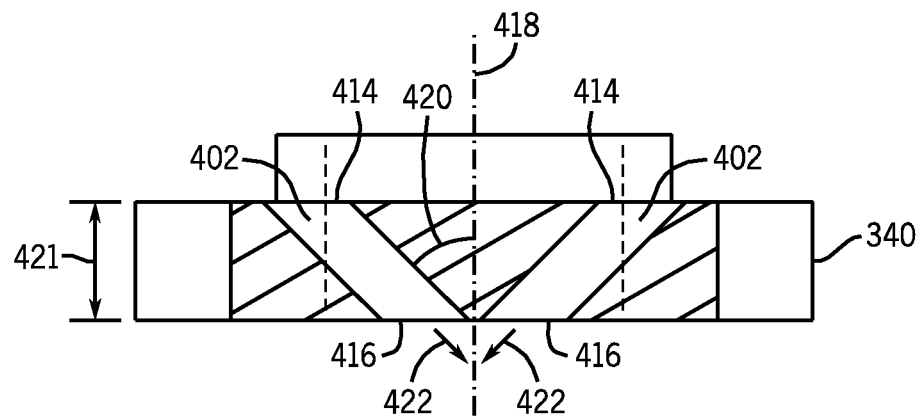
FIG. 10 is a cross-sectional bottom view of the mixing baffle, taken along line 10-10 of FIG. 9, in accordance with certain embodiments of the present technique.

FIG. 10 is a cross-sectional bottom view of the mixing baffle 340, taken along line 10-10 of FIG. 9. As illustrated, the flow passages 402 converge toward an axial center line 418. Specifically, each passage 402 forms an angle 420 with respect to the center line 418. In the present embodiment, the angle 420 is approximately 45 degrees. Therefore, the passages are oriented approximately 90 degrees relative to one another. In alternative embodiments, the angle 420 may be approximately between 5 to 85, 10 to 80, 15 to 75, 20 to 70, 25 to 65, 30 to 60, 35 to 55, 40 to 50, or about 45 degrees. By further example, the angle 420 may be greater than approximately 0, 10, 22.5, 30, 40, 45, 50, 55, 60, 65, 70, 75, 80, 85, or more degrees. As appreciated, larger angles 420 may facilitate enhanced mixing between the first and second liquids. However, a length 421 of the baffle 340 may be increased to accommodate the larger angles 420, thereby increasing the length of the spray coating device 12. Therefore, an angle 420 may be particularly selected to both provide effective mixing of the liquids while limiting the spray coating device length. In the present embodiment, liquid flows from the passage outlets 416 flow in a direction 422 and impinge one another, as illustrated. As previously discussed, this impingement facilitates enhanced mixing of the first and second liquids despite differences in flow rate and viscosity.

Figure 11:
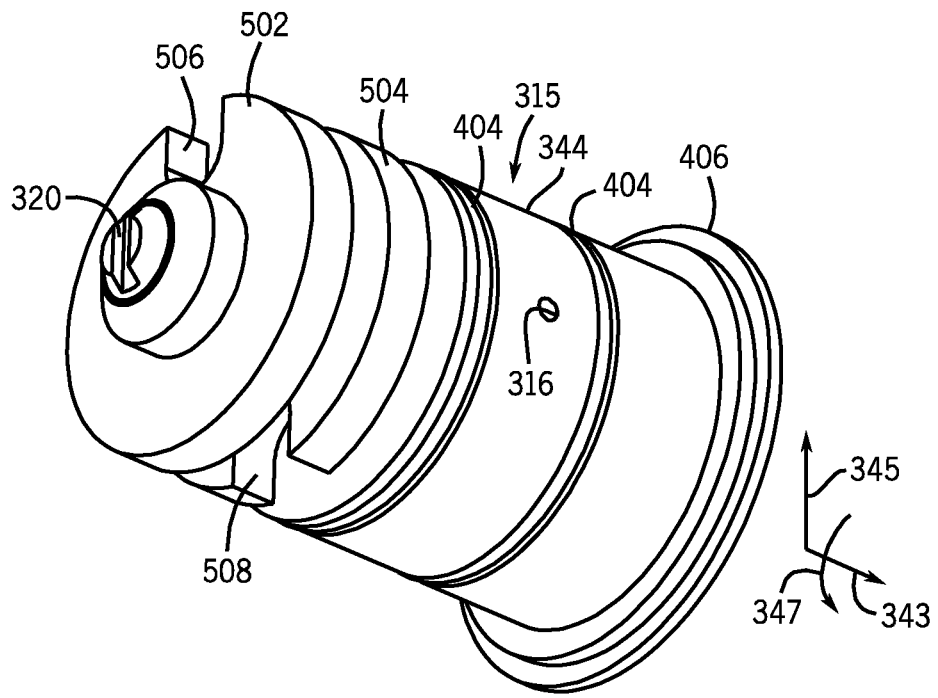
FIG. 11 is a perspective view of an alternative embodiment of the valve body shown in FIG. 6 in accordance with certain embodiments of the present technique.

FIG. 11 is a perspective view of an alternative embodiment of the valve body 315. Specifically, the alternative configuration is adapted for mixing liquids that include abrasives. For example, certain resins include a mineral filler such as calcium sulfate or alumina trihydrate in concentrations ranging from approximately 10% to 50%. While these mineral fillers provide enhanced qualities to certain FRP parts, their abrasive nature causes significant wear to various internal components of the spray coating device 12. For example, the mixing baffles 340 and 342 are particularly sensitive to such abrasive fillers. Therefore, an alternative valve body 315 including a different baffle configuration may be utilized when spraying resins that include mineral fillers. Furthermore, the valve body 315, and associated baffles, may be constructed from a harder material, such as precipitation hardened stainless steel, tungsten carbide, etc., to reduce wear.

As illustrated, the first baffle 340 is replaced with an alternative first baffle 502, and the second baffle 342 is replaced with an alternative second baffle 504. The first baffle 502 includes a U-shaped recess 506, and the second baffle 504 includes a U-shaped recess 508, positioned approximately 180 degrees from the recess 506 about the circumference of the second baffle 504. As the liquid flow reaches the valve body 315, the liquid is directed through the recess 506. The liquid flow then impinges upon an upstream surface of the second baffle 504, thereby establishing a turbulent flow that facilitates liquid mixing. The liquid is then forced to flow approximately 180 degrees in the circumferential direction 347 to pass through the recess 508. The position of the recesses 506 and 508 establish a tortuous flow path that serves to further mix the first liquid and the second liquid. Because the liquid is not directed through small converging passages, wear on the baffles 502 and 504 may be reduced, thereby extending the useful life of the valve body 315.

While the recess 508 is circumferentially offset approximately 180 degrees in the present embodiment, alternative embodiments may have different degrees of offset. For example, certain configurations may include a circumferential offset greater than approximately 20, 40, 60, 80, 100, 120, 140, 160, or more degrees. Further embodiments may include multiple recesses within each baffle 502 and 504, such as 2, 3, 4, 5, 6, or more. Yet further embodiments may include additional baffles to provide additional mixing of the liquids. This configuration may provide effective mixing of the first and second liquids despite the absence of converging flow passages present in the previously described embodiment.

Figure 12:
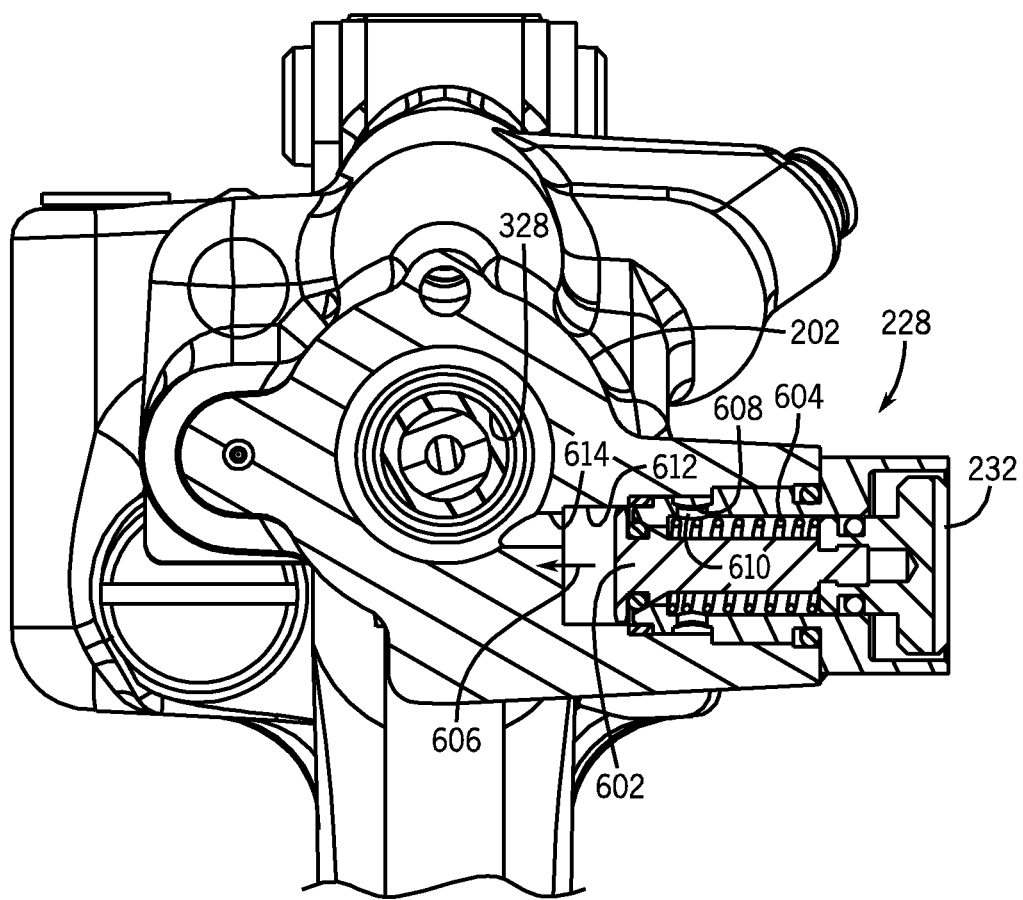
FIG. 12 is a cross-sectional front view of the spray coating device, taken along line 12-12 of FIG. 4, in accordance with certain embodiments of the present technique.

FIG. 12 is a cross-sectional front view of the spray coating device 12, taken along line 12-12 of FIG. 4, illustrating the liquid flushing system 228. As previously discussed, the liquid flushing system 228 is configured to flow a solvent through areas of the spray coating device 12 where the first liquid is present. This process significantly reduces or eliminates the possibility that resin or other material may cure within the spray coating device 12, thereby interfering with its operation. The liquid flushing system 228 includes an activation switch 232, a shaft 602, and a compression spring 604. The liquid flushing system 228 is activated by depressing the switch 232, thereby compressing the spring 604 and driving the shaft 602 to move in a direction 606. Movement of the shaft 602 establishes a flow path from the solvent inlet 230 through an annular cavity 608 and an orifice 610 in the liquid flushing system 228 to a first conduit 612. The solvent then flows through a second conduit 614 into the mixing chamber 328. From the mixing chamber 328, the solvent flows in the downstream direction 219 through each of the previously described elements and exits the spray tip 205. In this manner, each element that contacts the first liquid is exposed to the solvent such that the first liquid is flushed from the spray coating device 12. As previously discussed, the present embodiment facilitates effective mixing of liquids within a shorter distance than configurations which do not employ a counter flow arrangement and mixing baffles. Therefore, less solvent may be utilized to flush the spray coating device 12, thereby reducing operational costs. Furthermore, because the mixing chamber 328 is positioned directly adjacent to the first liquid needle valve 329, flushing resin from additional areas within the body 202 is obviated.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a spray gun, comprising:
a first liquid passage configured to flow a first liquid in a generally downstream direction toward a spray tip;
a second liquid passage configured to flow a second liquid in a generally upstream direction such that the second liquid impinges upon the first liquid at an outlet to the second liquid passage, wherein the upstream direction is substantially opposite from the downstream direction;
a first mixing baffle downstream from the outlet to the second liquid passage, and including a first recess configured to direct liquid flow toward an impingement surface; and
a second mixing baffle downstream from the first mixing baffle, and including the impingement surface and a second recess;
wherein the first recess of the first mixing baffle is circumferentially offset from the second recess of the second mixing baffle.

2. The system of claim 1, comprising a check valve disposed at the outlet to the second liquid passage and configured to block a flow of the first liquid into the second liquid passage, wherein the check valve forms a substantially annular orifice configured to provide a generally even distribution of the second liquid into the first liquid passage.

3. The system of claim 1, wherein the first mixing baffle and the second mixing baffle define a tortuous flow path.

4. The system of claim 1, wherein the first recess and the second recess are circumferentially offset approximately 180 degrees.

5. The system of claim 1, wherein the first recess, the second recess, or a combination thereof, is substantially U-shaped.

6. The system of claim 1, comprising a static mixer disposed downstream from the second mixing baffle, and including a plurality of turning vanes each configured to split and rotate a liquid flow.

7. The system of claim 1, wherein the spray tip comprises an impingement tip including a plurality of converging exit orifices configured to direct streams of liquid toward one another.

8. The system of claim 1, wherein the spray gun comprises a liquid flushing system configured to provide solvent upstream of the outlet to the second liquid passage.

9. A system, comprising:
a spray gun, comprising:
a first liquid passage configured to flow a first liquid in a generally downstream direction toward a spray tip;
a second liquid passage configured to flow a second liquid in a generally upstream direction such that the second liquid impinges upon the first liquid at an outlet to the second liquid passage, wherein the upstream direction is substantially opposite from the downstream direction;
a check valve disposed at the outlet to the second liquid passage and configured to block a flow of the first liquid into the second liquid passage, wherein the check valve forms a substantially annular orifice configured to provide a generally even distribution of the second liquid into the first liquid passage; and
at least one mixing baffle positioned downstream from the outlet to the second liquid passage, wherein the at least one mixing baffle is configured to mix the first liquid with the second liquid, and the at least one mixing baffle includes at least one recess configured to direct a liquid flow toward an impingement surface.

10. The system of claim 9, wherein the at least one mixing baffle comprises a first mixing baffle and a second mixing baffle, the at least one recess comprises a first recess in the first mixing baffle, and the second mixing baffle includes the impingement surface.

11. The system of claim 10, wherein the at least one recess comprises a second recess in the second mixing baffle, and the second recess of the second mixing baffle is circumferentially offset from the first recess of the first mixing baffle.

12. The system of claim 11, wherein the first recess and the second recess are circumferentially offset approximately 180 degrees.

13. The system of claim 9, wherein the at least one recess is substantially U-shaped.

14. The system of claim 9, wherein the at least one mixing baffle defines a tortuous liquid flow path.

15. A system, comprising:
a multi-liquid mixing device, comprising:
 a first mixing baffle including a first recess, wherein the first recess is configured to direct a liquid flow toward an impingement surface; and
 a second mixing baffle downstream from the first mixing baffle, and including the impingement surface and a second recess;
 wherein the first recess of the first mixing baffle is circumferentially offset from the second recess of the second mixing baffle.

16. The system of claim 15, wherein the second recess is configured to direct the liquid flow toward a second impingement surface.

17. The system of claim 15, wherein the first mixing baffle, the second mixing baffle, or a combination thereof, is formed from precipitation hardened stainless steel, tungsten carbide, or a combination thereof.

18. The system of claim 15, wherein the first recess and the second recess are circumferentially offset approximately 180 degrees.

19. The system of claim 15, wherein the first recess, the second recess, or a combination thereof, is substantially U-shaped.

20. The system of claim 15, wherein the first mixing baffle and the second mixing baffle define a tortuous liquid flow path.

* * * * *